United States Patent [19]

Rascher et al.

[11] 4,240,655
[45] Dec. 23, 1980

[54] PIPE COUPLING

[76] Inventors: Andreas Rascher, Tannengut 2, Aarau, Switzerland, CH 5000; Jürg Zbinden, Worbstrasse 45, Rubigen, Switzerland, CH 3113

[21] Appl. No.: 959,421

[22] Filed: Nov. 13, 1978

[30] Foreign Application Priority Data

Nov. 17, 1977 [CH] Switzerland ............ 14036/77

[51] Int. Cl.³ .......................................... F16L 21/00
[52] U.S. Cl. ................................. 285/323; 285/372; 285/382.2; 285/383; 285/421
[58] Field of Search ............... 285/372, 421, 382.2, 285/382, 373, 236, 323, 322

[56] References Cited

U.S. PATENT DOCUMENTS

| 654,073 | 7/1900 | Olinger | 285/383 |
|---|---|---|---|
| 1,186,813 | 6/1916 | McFerran | 285/382.2 X |
| 2,288,225 | 6/1942 | Boughton | 285/372 |
| 2,741,498 | 4/1956 | Elliott | 285/382.2 X |
| 3,104,898 | 9/1963 | MacDonald et al. | 285/236 |
| 3,149,860 | 9/1964 | Hallesy | 285/382 X |
| 3,235,293 | 2/1966 | Condon | 285/233 |
| 3,558,164 | 1/1971 | Havell | 285/236 |
| 3,765,708 | 10/1973 | Pease et al. | 285/382.2 |
| 3,933,377 | 1/1976 | Arrowood | 285/236 X |
| 4,101,151 | 7/1978 | Ferguson | 285/373 X |

FOREIGN PATENT DOCUMENTS

| 182275 | 6/1955 | Austria | 285/372 |
|---|---|---|---|
| 840489 | 6/1952 | Fed. Rep. of Germany | 285/322 |
| 359010 | 4/1938 | Italy | 285/322 |

Primary Examiner—Thomas F. Callaghan
Attorney, Agent, or Firm—Peter K. Kontler

[57] ABSTRACT

A flange compression pipe coupling wherein the end portions of the pipes to be coupled are surrounded by an inner jacket consisting of ductile metallic material. The inner jacket is surrounded by a radially deformable outer jacket which is biased against the exterior of the outer jacket by two flanged rings having conical internal surfaces. The outer jacket causes plastic deformation of the inner jacket until the latter sealingly engages the end portions of the pipes whereupon the extent of plastic deformation of the inner jacket remains unchanged.

6 Claims, 8 Drawing Figures

PIPE COUPLING

BACKGROUND OF THE INVENTION

The present invention relates to a pipe coupling for pipe ends with a sealing sleeve which is slipped onto the pipe ends to be coupled to each other and is surrounded by concentrically acting tensioning means.

Pipe couplings wherein the sealing sleeve consists of synthetic plastic material are known and described, for example, in German Offenlegunsgsschrift No. 2,518,898. They exhibit the drawback that the fluid is allowed to leak when the pipes convey media at an elevated temperature or elevated pressure.

OBJECT AND SUMMARY OF THE INVENTION

It is an object of the present invention to improve a pipe coupling of the aforementioned character in such a way that it resists substantially higher pressures and temperatures of the flowing medium.

In accordance with the invention, this object is accomplished in that the sealing sleeve comprises an inner jacket and an outer jacket which is concentrically deformable toward the longitudinal axis, that the inner and outer jackets consist of a metal or alloy, and that the metal or alloy and/or the dimensions of the inner and outer jackets are selected in such a way that the inner jacket undergoes plastic deformation in the radial direction under the radial pressure of tensioning means until it reaches a stationary condition of deformation.

The invention will be explained by way of example with reference to the enclosed schematic drawings.

DESCRIPTION OF THE PREFERRED EMBODIMENTS

Figure 1:
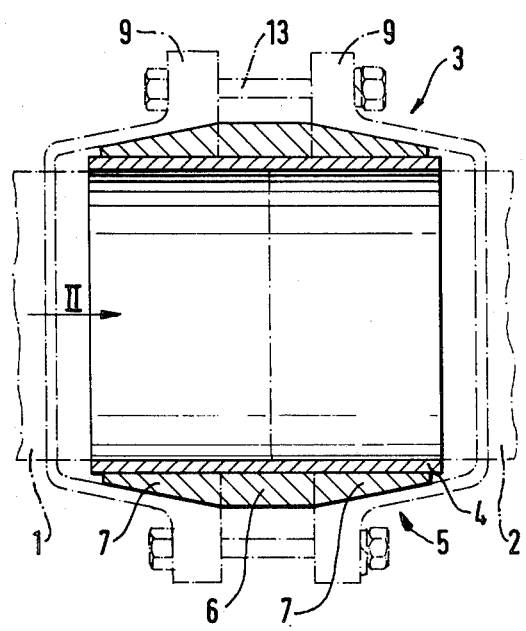
FIG. 1 is a longitudinal sectional view of a pipe coupling which embodies the invention.

In FIG. 1, the reference characters 1 and 2 denote the end portions of two cylindrical members or pipes (illustrated by phantom lines) which are to be coupled to each other. The end portions 1 and 2 are inserted into a bipartite sealing sleeve 3. The sealing sleeve 3 consists of an inner jacket 4 and an outer jacket 5. The inner jacket 4 is made of a material exhibiting only negligible cold flow characteristics, such as for example pure aluminum or an alloy of aluminum with silicon and/or magnesium. Such alloys are available on the market under the designation "Anticorodal". The outer jacket 5 comprises a cylindrical central portion 6 and two end portions 7 which taper conically toward the ends. The jacket 5 is further provided with a longitudinal slot 8 and is preferably made of an alloy of aluminum with silicon or magnesium. The material of the jacket 5 can be harder than the material of the jacket 4. The central portion 6 and the end portions 7 can constitute discrete parts. Flanged deforming rings 9 (indicated by phantom lines) with complementary inner cones are slipped onto the conical outer surfaces of the end portions 7 and are secured to each other by means of screws 13. During tensioning, the flanged rings 9 slide onto and concentrically deform the outer portions 7 owing to the provision of the longitudinal slot 8. Thus, the inner jacket 4 is pressed onto the end portions 1 and 2 so that it tightly seals the coupling zone. The central longitudinal part of the inner side of the inner jacket 4 can be provided with a non-illustrated ring-shaped rib which serves as an abutment for the neighboring end faces of end portions 1 and 2.

Figure 3:
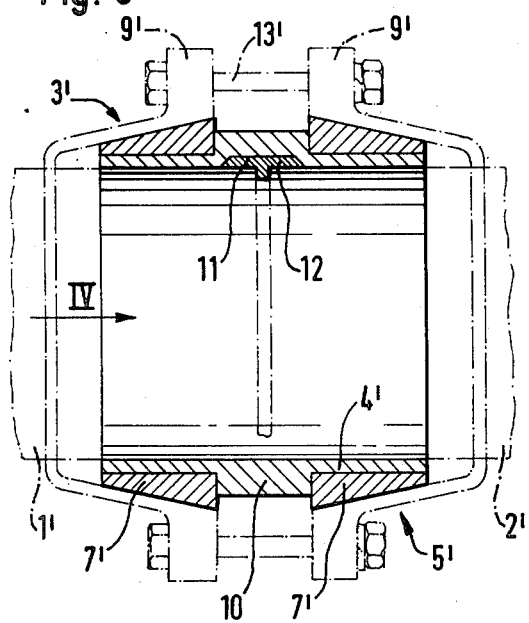
FIG. 3 is a longitudinal sectional view of a second embodiment of the improved pipe coupling.
Figure 4:
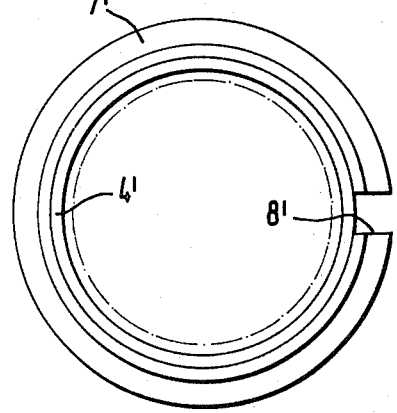
FIG. 4 is a view as seen in the direction of arrow IV in FIG. 3.

In principle, the embodiment of FIGS. 3 and 4 is similar. In contrast to the first embodiment, the central portion of the outer side of the inner jacket 4' has a ring-shaped rib 10 serving as an abutment for the end portions halves 7' which constitute the outer jacket 5' and are slipped onto the inner jacket 4'. The end portions 7' of the outer jacket 5' are provided with a longitudinal slot 8'. The flanged rings 9' are slipped onto the end portions 7' and are secured to each other by means of screws 13' so that the end portions 7' exert a concentric pressure upon the inner jacket 4' and subject the latter to partial plastic deforming action whereby the inner jacket 4 sealingly engages the end portions 1 and 2. The inner side of the inner jacket 4' can be provided with a ring-shaped groove 11 which serves for reception of a ring-shaped body or insert 12 of T-shaped cross section. The radially inwardly extending web of the ring-shaped body 12 serves as a stop for the neighboring end portions 1' and 2'. If necessary, the height of this web, which constitutes a ring-shaped rib, will conform to the wall thickness of the end portions 1' and 2' in order to avoid outwardly extending cavities in the pipeline. At the same time, the ring-shaped body 12 serves as a sealing body which prevents contact between the flowing medium on the one hand and the inner jacket 4' on the other hand. Thus, in order to protect the inner jacket 4' against an aggressive medium, it suffices to select a ring-shaped body 12 which consists of a material capable of resisting the action of the medium.

In both embodiments, the inner side of the inner jacket 4 or 4' can be provided with several ring-shaped grooves which are spaced apart from each other as considered axially of the inner jacket 4-4' to thereby enhance the deformability of the inner jacket 4 or 4'. Among others, such embodiment is desirable when the end portions of the pipes to be coupled to each other have pronouncedly different outer diameters.

Figure 2:
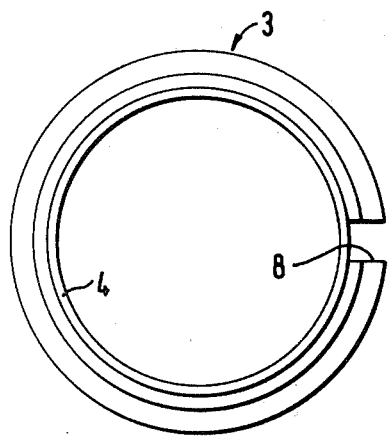
FIG. 2 is a view as seen in the direction of arrow II in FIG. 1.

In the embodiment according to FIGS. 1 and 2, the inner jacket 4 can be provided with a ring-shaped groove 11, in the same way as in the embodiment of FIGS. 3 and 4, for reception of a ring-shaped body 12 of T-shaped cross section, whereby the radially inwardly extending web of the ring-shaped body 12 constitutes the aforementioned ring-shaped rib.

Figure 5:
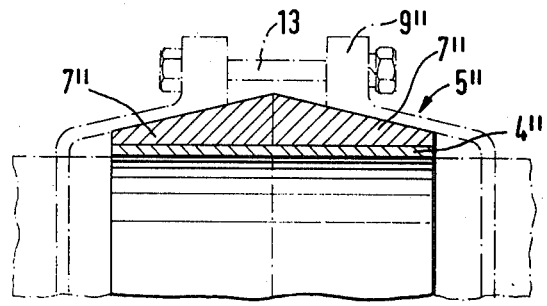
FIG. 5 is a longitudinal sectional view of a third embodiment of the improved pipe coupling.
Figure 6:
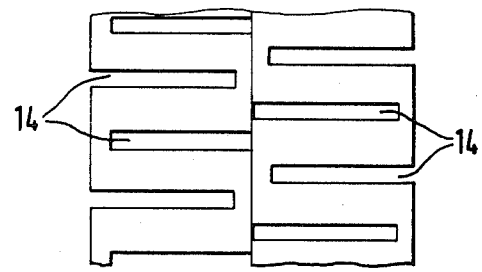
FIG. 6 is a partial developed view of the outer jacket of the pipe coupling which is shown in FIG. 5.

In the embodiment of FIGS. 5 and 6, the outer jacket 5" comprises two parts 7" which are slipped onto the inner jacket 4". Prior to tensioning of the parts 7", these parts preferably exhibit a circular cylindrical cross-sectional outline and are slipped onto the inner jacket 4" while assuming such shape. In order to insure that they assume a conical outer shape under the action of the flanged rings 9''', the parts 7'' are provided with deformation-enhancing slits 14. The deformation-enhancing slits 14 are alternately milled from different end faces and terminate short of the opposite end faces. The outer and inner jackets 5'' and 4'' consist of the same material as in the preceding examples.

Figure 7:
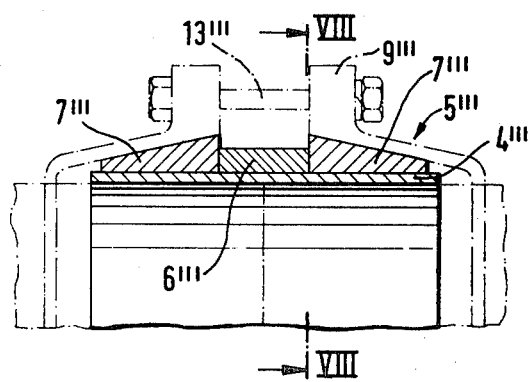
FIG. 7 shows a fourth embodiment of the improved pipe coupling.
Figure 8:
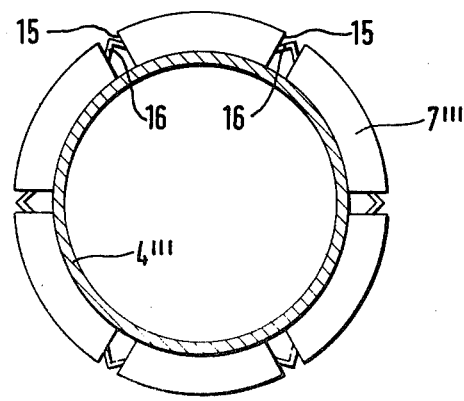
FIG. 8 is a section taken along the line VIII—VIII of FIG. 7.

In the embodiment which is shown in FIGS. 7 and 8, a distancing ring 6''' is disposed between the parts 7''' of the outer jacket. Prior to tensioning, the parts 7''' of the outer jacket preferably exhibit a circular cylindrical cross-sectional outline. In order to enhance radial deformability of the parts 7''' of the outer jacket, such parts are provided with six longitudinal slits 15 which are bridged by webs 16. The webs 16 hold the sections of the respective parts 7''' rigidly together prior to tensioning. These webs are bent outwardly in the form of wedges and are therefore foldable so that they offer a rather low resistance to deformation of the outer jacket 7''' in the tangential direction. Under the action of flanged rings 9''', the cross sections of the parts 7''' of the outer jacket are reduced in accordance with the conicity of the flanged 9''' which rings slide onto the parts 7''' of the outer jacket. The outer and inner jackets 5''' and 4''' consist of the same materials as in the previously described examples.

In each embodiment, the selection of materials for the outer jacket and the inner jacket depends on the dimensioning of these parts, on the one hand; on the other hand, the materials are selected in such a way that, under the action of flanged rings, the ductile inner jacket undergoes a partial plastic and the outer jacket undergoes a predominantly elastic deformation. In each instance, the material of the inner jacket is not permitted to creep under the action of prevailing tensional stresses or is permitted to creep only until it reaches a stable condition. In such condition, the deformation of the inner jacket which is attributed to creep must be compensated for by an elastic component of deformation without appreciable reduction of radial compressing stress which is generated by the flanged deforming rings, i.e., without loosening of the pipe coupling.

The improved pipe coupling exhibits the advantage that it withstands longitudinal tensional stressing of the pipes and that the pipes need not undergo a permanent deformation. Another advantage consists in that the pipe coupling insures a tight connection for large pipe diameters with pronounced tolerances in diameters.

We claim:

1. A coupling for abutting end portions of two at least substantially coaxial pipes, comprising a tubular inner jacket of cylindrical cross section; an outer jacket axially slidable onto said inner jacket and including two parts having respective conical surfaces which converge toward mutually spaced ends of said outer jacket, said parts having slots which extend in parallelism with the axis of the pipes over at least a predominant portion of the lengths, and are uniformly distributed over the peripheries, of said parts of said outer jacket and subdivide the latter into ring segments, and easily deformable webs extending transversely of said slots and interconnecting said ring segments, said outer jacket having a thickness exceeding that of said inner jacket at least at the mutually facing ends of said outer jacket parts; flanged clamping rings shiftable onto said outer jacket and having conical inner surfaces contacting and acting on said conical surfaces of said outer jacket parts; and means for drawing said clamping rings toward one another axially of the pipes to predominantly elastically deform said outer jacket and predominantly plastically deform said inner jacket.

2. The coupling of claim 21, wherein said slots extend over less than the length of the respective outer jacket part, leaving said webs at the ends thereof.

3. The coupling of claim 22, wherein said slots extend into the respective part alternatingly from one and the other end of such part.

4. The coupling of claim 21, wherein said webs have substantially V-shaped configurations as considered in radial planes of the coupling.

5. The coupling of claim 1, wherein each of said outer jacket parts comprises two discrete tubular halves.

6. The coupling of claim 1, wherein said outer jacket consists of metallic material which is harder than the material of said inner jacket.

* * * * *